US008675968B2

(12) United States Patent
Kusakabe

(10) Patent No.: US 8,675,968 B2
(45) Date of Patent: Mar. 18, 2014

(54) IMAGE PROCESSING APPARATUS

(75) Inventor: Yoshiaki Kusakabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 889 days.

(21) Appl. No.: 12/533,158

(22) Filed: Jul. 31, 2009

(65) Prior Publication Data
US 2010/0054609 A1 Mar. 4, 2010

(30) Foreign Application Priority Data
Aug. 26, 2008 (JP) ................................ 2008-217073

(51) Int. Cl.
*G06K 9/48* (2006.01)
(52) U.S. Cl.
USPC ............... 382/199; 347/15; 347/19; 358/1.9; 358/3.28; 328/177; 328/187
(58) Field of Classification Search
USPC ............... 347/15, 19; 358/1.9, 3.28; 382/177, 382/187, 199
See application file for complete search history.

(56) References Cited

U.S. PATENT DOCUMENTS

| | | | | |
|---|---|---|---|---|
| 5,563,713 A | * | 10/1996 | Sugiura | 382/256 |
| 5,652,660 A | * | 7/1997 | Seto et al. | 358/300 |
| 5,767,980 A | | 6/1998 | Wang et al. | |
| 5,850,488 A | * | 12/1998 | Asai et al. | 358/1.2 |
| 6,636,631 B2 | * | 10/2003 | Miyazaki et al. | 382/187 |
| 6,646,649 B1 | * | 11/2003 | Tanabe et al. | 345/588 |
| 6,983,071 B2 | * | 1/2006 | Nishiwaki | 382/177 |
| 7,298,524 B2 | * | 11/2007 | Shibata et al. | 358/1.9 |
| 7,359,568 B2 | * | 4/2008 | Dobashi | 382/266 |
| 7,631,955 B2 | * | 12/2009 | Ishikawa | 347/15 |
| 8,174,733 B2 | * | 5/2012 | Kobayashi | 358/3.28 |
| 2002/0172422 A1 | * | 11/2002 | Nishiwaki | 382/177 |
| 2007/0188498 A1 | * | 8/2007 | Okada et al. | 345/469 |
| 2007/0216917 A1 | | 9/2007 | Wakasugi | |
| 2007/0242096 A1 | * | 10/2007 | Baba et al. | 347/19 |
| 2009/0080003 A1 | * | 3/2009 | Murakami | 358/1.9 |
| 2009/0091574 A1 | * | 4/2009 | Sawazaki et al. | 345/469 |

FOREIGN PATENT DOCUMENTS

| | | |
|---|---|---|
| JP | 01309566 A | 12/1989 |
| JP | 04053974 A | 2/1992 |
| JP | 09020003 A | 1/1997 |
| JP | 10304203 A | 11/1998 |
| JP | 2000-066858 A | 3/2000 |
| JP | 2001-028686 A | 1/2001 |
| JP | 2005277544 A | 10/2005 |
| JP | 2006-186485 A | 7/2006 |
| JP | 2007245537 A | 9/2007 |

* cited by examiner

*Primary Examiner* — Gregory M Desire
(74) *Attorney, Agent, or Firm* — Panitch Schwarze Belisario & Nadel LLP

(57) ABSTRACT

An image processing apparatus includes a character data extraction unit, a contour data extraction unit, and an image density changing unit. The character data extraction unit extracts character data, forming a character image serving as a target to be read by an image reading apparatus, from image data. The contour data extraction unit extracts contour data forming a contour image of the character image from the image data. The image density changing unit changes an image density of the contour image base on the contour data extracted from the contour data extraction unit.

10 Claims, 17 Drawing Sheets

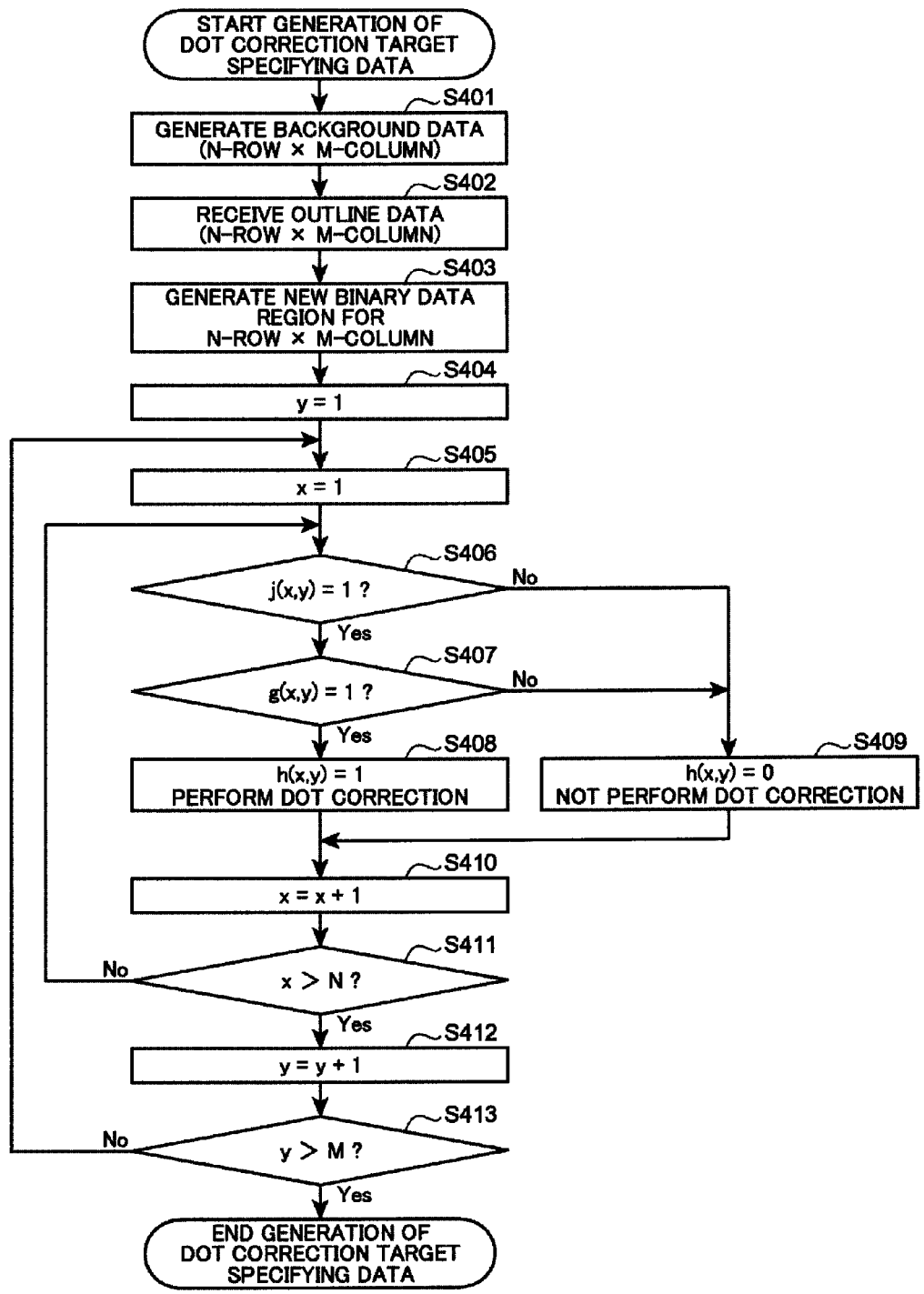

IMAGE PROCESSING APPARATUS

BACKGROUND OF THE INVENTION

1. Field of the Invention

The present invention relates to an image processing apparatus processing image data.

2. Description of Related Art

A related art image processing apparatus fringes a contour of a character image in white in a case of printing an image having the character image to be read by an image reading apparatus such as a scanner and a bar-code reader, allowing the character image to be accurately read by the image reading apparatus.

For example, Japanese Unexamined Patent Application Publication 2001-28686 discloses a method for binarizing a multi-color image in usage of a monochrome printer to facilitate recognition of a letter or letters as a character image. According to the binarization method, the letter or letters are printed in such a manner that periphery of the letters to be recognized is fringed in white, so that the letters are separated from a background portion, thereby surely recognizing the letters.

In a case where the character image is printed in such a manner that the periphery thereof to be recognized is fringed in white by the binarization method, however, image information in a fringed portion is completely lost, causing the loss of readability.

The present invention provides an image processing apparatus capable of reducing (if not minimizing) occurrences of losing image information in a fringed portion and capable of maintaining readability of a character image to be recognized.

BRIEF SUMMARY OF THE INVENTION

According to one aspect of the invention, an image processing apparatus includes: a character data extraction unit extracting character data, forming a character image serving as a target to be read by an image reading apparatus, from image data; a contour data extraction unit extracting contour data forming a contour image of the character image from the image data; and an image density changing unit changing an image density of the contour image base on the contour data extracted from the contour data extraction unit.

According to another aspect of the invention, an image processing apparatus includes: a character data extraction unit extracting character data, forming a character image serving as a target to be read by an image reading apparatus, from image data; a contour data extraction unit extracting contour data forming a contour image of the character image from the image data; and a hue color changing unit changing a hue color of the contour image.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the invention and many of the attendant advantage thereof will be readily obtained as the same becomes better understood by reference to the following detailed description when considered in connection with the accompanying drawings, wherein:

FIG. 9 is a flowchart illustrating an example procedure for generating dot correction target specifying data according to the first embodiment of the present invention;

DETAILED DESCRIPTION OF PREFERRED EMBODIMENTS

Figure 1A:
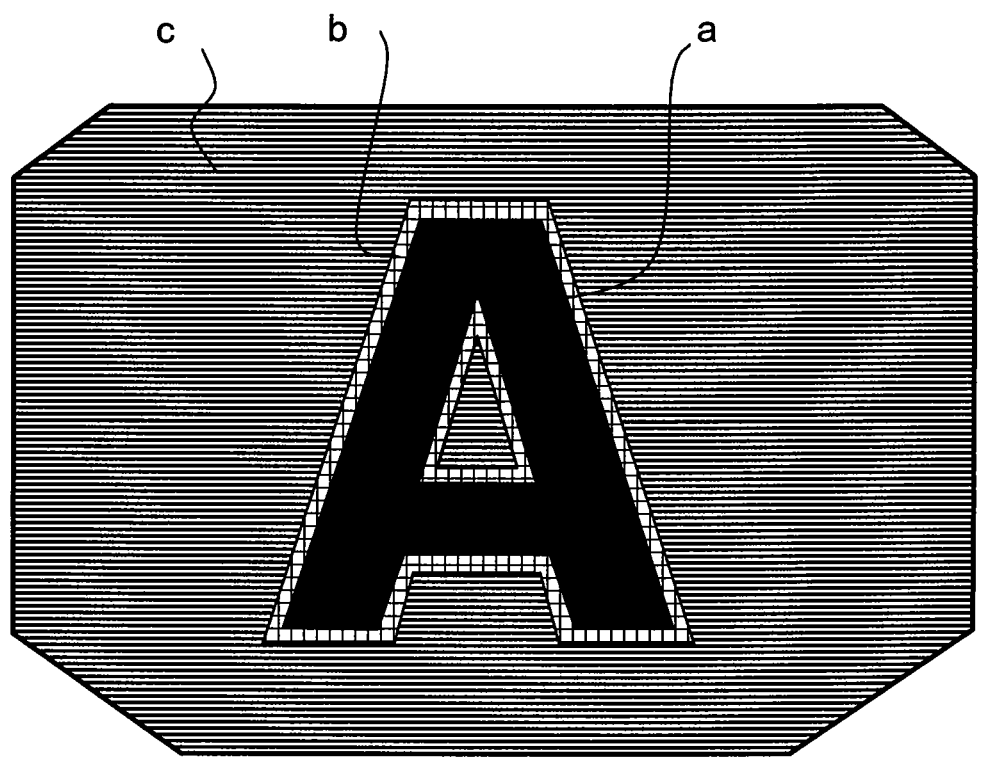
FIG. 1A is a schematic diagram illustrating an example of a print image printed by a printer serving an image processing apparatus according to a first embodiment of the present invention.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, like reference numerals designate identical or corresponding parts throughout the several views.

First Embodiment

Referring to FIG. 1A, an example of a print image printed by a printer 100 serving as an image processing apparatus according to a first embodiment of present invention is illustrated. The print image includes: a character image having a single color of black (K); a background image having process colors of yellow (Y), magenta (M), and cyan (C); and an outline image having the background image printed in the process colors with low density at which the background image is visually recognized. The outline image serves as a boundary image between the character image and the background image. The character image, outline image, and background image are indicated by reference letters a, b, and c, respectively, in FIG. 1A. A circle portion illustrated with a solid line in the schematic diagram of FIG. 1 is described below referring to an enlarged partial view of FIG. 1B.

Figure 1B:
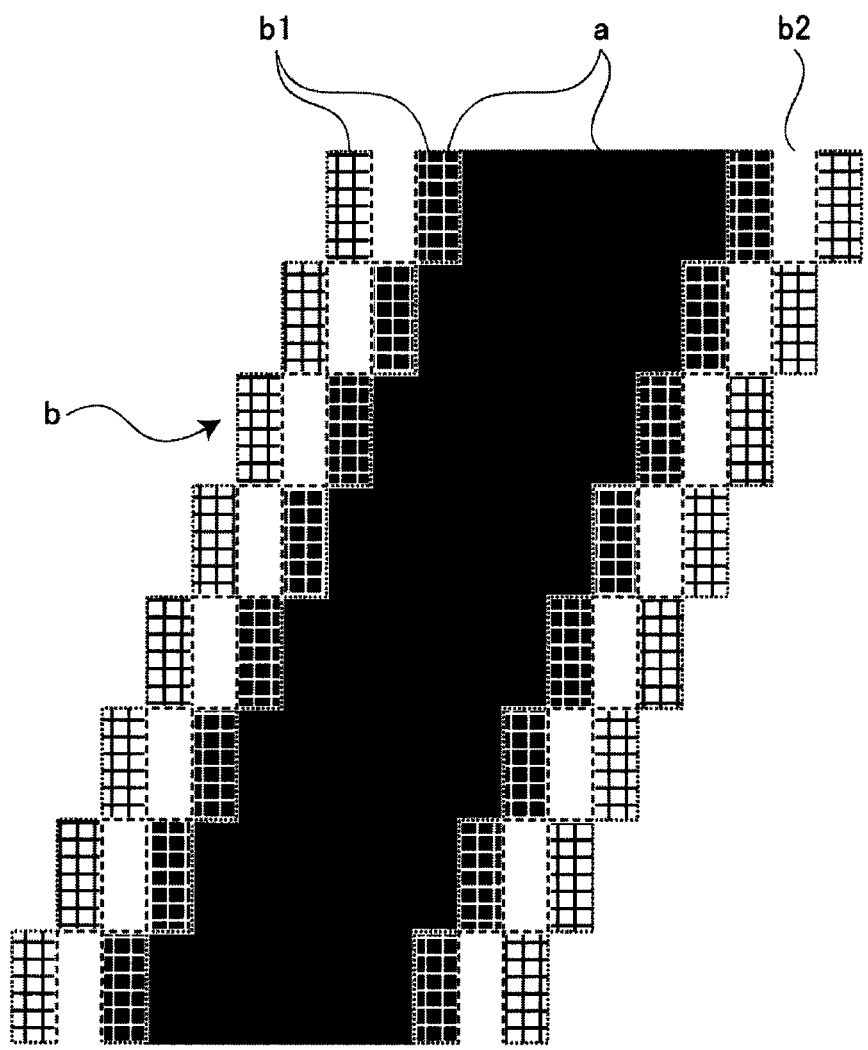
FIG. 1B is an enlarged partial view illustrating a circle portion of FIG. 1A.

The enlarged partial view of FIG. 1B partially illustrates a letter "A" of FIG. 1A. The outline image includes a fringe image and a contour image respectively indicated by reference numerals b1 and b2 in FIG. 1B. The contour image is shown in an outside portion of the "A," that is, a white portion. The fringe image is shown in an outside portion of the contour image, that is, a white mesh area and a black mesh area as shown in FIG. 1B. The outside image is an image formed by logical multiplication of the fringe image and a reverse character image formed by reversing values of one (1) and zero (0) with respect to the character image.

A variety of correction methods have been introduced to lower the density of an image to be formed of the process colors. A density correction and a gradation correction are generally known among the various correction methods. According to the density correction, size of each dots included in print data is adjusted, that is, light intensity irradiated with respect to a photosensitive drum from a light source of an exposure device in a printer is adjusted, so that an amount of toner to be adhered to each dot on a recording medium is changed, thereby correcting the density. According to the gradation correction, on the other hand, a number of dots per unit area of the print data are adjusted, so that density of the toner to be adhered to the recording medium is changed. Since the image processing apparatus of the present invention needs to perform the print operation by lowering the density while reducing the occurrences of losing a hue color of the outline image, the gradation correction correcting the size of each dot included in the print data is performed.

Figure 2:
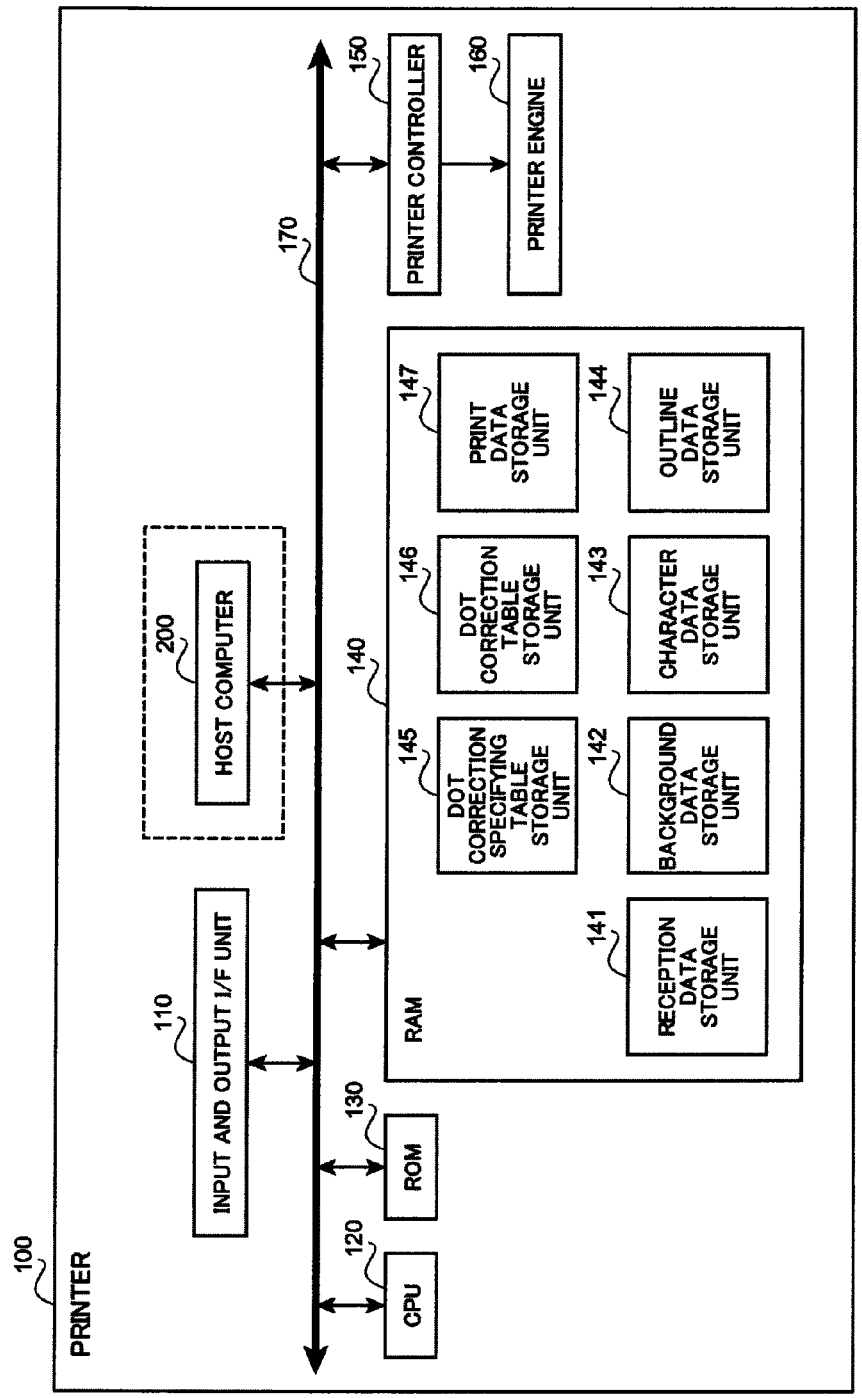
FIG. 2 is a block diagram illustrating the printer serving as the image processing apparatus according to the first embodiment of the present invention.

Referring to FIG. 2, the printer 100 serving as the image processing apparatus according to the first embodiment of the present invention is illustrated with essential elements thereof in a block diagram. The printer 100 employs an electrophotographic method. The printer 100, for example, allows the toner to be adhered to an electrostatic latent image formed on the photosensitive drum based on image data, allows the toner adhered to the electrostatic latent image on the photosensitive drum to be transferred to the recording medium, and allows the toner transferred to the recording medium to be fixed on the recording medium by application of heat and pressure.

The printer 100 includes an input and output interface (I/F) unit 110, a central processing unit (CPU) 120, a read only memory (ROM) 130, a random access memory (RAM) 140, a printer controller 150, and a printer engine 160. Each of these elements is connected through a data bus 170.

The input and output I/F unit 110 performs data communications with a host computer 200 connected through a network such as a local area network (LAN).

The CPU 120 executes a control program stored in the ROM 130, thereby controlling the printer as a whole.

The ROM 130 serves as a nonvolatile memory region and stores, for example, the control program for controlling the printer 100 as a whole.

The RAM 140 serves as a main storage unit of the printer 100. In a case where the CPU 120 executes the control program stored in the ROM 130, the RAM 140 serves as a memory region used as a working area. The RAM 140 includes a reception data storage unit 141, a background data storage unit 142, a character data storage unit 143, an outline data storage unit 144, a dot correction specifying table storage unit 145, a dot correction table storage unit 146, and a print data storage unit 147.

The reception data storage unit 141 stores the image data received by the printer 100 from the host computer 200 through the input and output I/F unit 110.

The background data storage unit 142 stores background data extracted by a background data extraction unit 151 (described later). Herein, the background data represent a data format of an image formed in a position in which the background image and the outline image illustrated in FIG. 1 are combined among the image data received from the host computer 200. The background data serve as a group of pixels provided by subtraction of character data (described later) from all the reception data.

The character storage unit 143 stores the character data extracted by a character data extraction unit 152 (described later). The character data represent a data format of the character image illustrated in FIG. 1 among the image data received from the host computer 200. The character data are provided by extracting pixels as a group from the reception data such that a video count value for K (black) becomes one hundred (100) percent.

The outline data storage unit 144 stores data corresponding to a periphery portion of the character data. The outline data represent a data format of the outline image illustrated in FIG. 1 among the image data received from the host computer 200. The outline image is formed by outlining the character image and providing the background data of which the density is corrected to the outline portion.

The dot correction specifying table storage unit 145 stores a dot correction target specifying table. Herein, the dot correction target specifying table is created based on the background data stored in the background data storage unit 142 and the outline data stored in the outline data storage unit 144. The dot correction target specifying table is a binary table representing whether or not prescribed dots of the outline data are subjected to a change of dot size thereof.

The dot correction table storage unit 146 stores a dot correction table including the size of each dot of the outline data in a table format. The dot correction table is created based on the background data stored in the background data storage unit 142 and the outline data stored in the outline storage unit 144.

The print data storage unit 147 stores the print data to be output to the printer engine 160. The print data are generated, based on the dot correction table, by composing the outline data of which the dot size is changed, the character data, and the background data.

The printer controller 150 can use a system LSI, for example, an application specific integrated circuit (ASIC), or a field programmable gate array (FPGA). The printer controller 150 controls the printer engine 160. Moreover, the printer controller 150, for example, extracts prescribed data from the image data received from the host computer 200, controls outline extraction of the prescribed data extracted, executes a density changing process of the image in a portion of a print data region, executes a process on each of the extracted data, and composites such processed data to generate the print data. The printer controller 150 is described in detail below with reference to FIG. 3.

Figure 3:
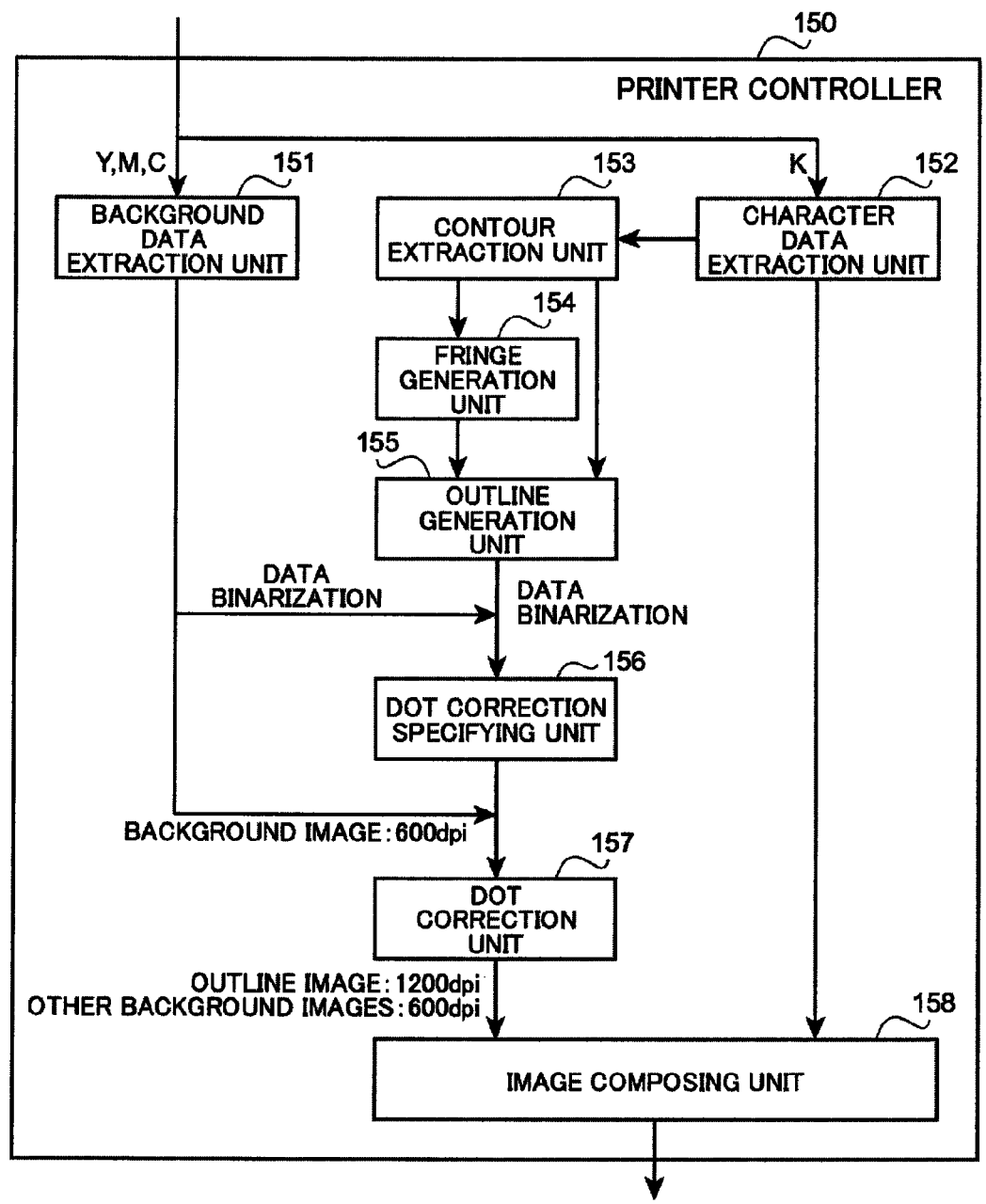
FIG. 3 is a block diagram illustrating a printer controller of the image processing apparatus illustrated in FIG. 2.

The printer controller 150 includes the background data extraction unit 151, the character data extraction unit 152, a contour extraction unit 153, a fringe generation unit 154, an outline generation unit 155, a dot correction specifying unit 156, a dot correction unit 157, and an image composing unit 158 as illustrated in FIG. 3.

The background extraction unit 151 extracts the background data from the image data transmitted from the host computer 200.

The character data extraction unit 152 extracts the character data from the image data transmitted from the host computer 200.

The contour extraction unit 153 extracts the contour image as the contour data. Herein, the contour image corresponds to the contour of the character image generated based on the character data.

The fringe generation unit 154 generates the fringe image as fringe data based on the contour of the character image. Herein, the fringe image corresponds to the outside of the character image, and the fringe data are binary data.

The outline generation unit 155 generates the outline image to be the outline of the character image as outline data. Herein, the outline data are binary data and are composition of the background data and the fringe data.

The dot correction specifying unit 156 creates the dot correction target specifying table based on the outline data generated by the outline generation unit 155. The dot correction target specifying table is the binary table representing whether or not the prescribed dots of the outline data are subjected to a change of dot size thereof.

The dot correction unit 157 creates a table format of the dot size of the prescribed dots included in the outline data based on the background data and the outline data.

The image composing unit 158 composes the character data and the background data of which the dot size is corrected. Such composite data are output to the printer engine 160.

The printer engine 160, being controlled by the CPU 120, forms the image on the recording medium based on the print data generated by the printer controller 150.

The data bus 170 serves as a communication path and transmits various data including the image data.

Figure 4:
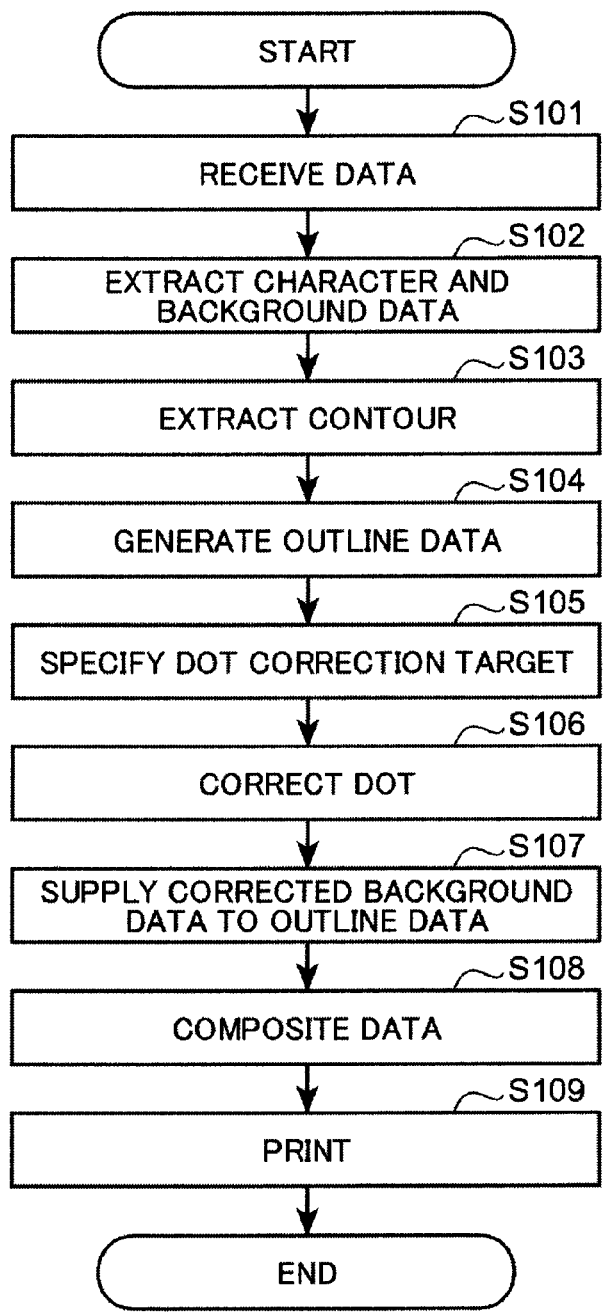
FIG. 4 is a flowchart illustrating an example procedure for processing an image by the printer according to the first embodiment of the present invention.

Referring to a flowchart of FIG. 4, a description is given of the process on the image by the printer 100. The printer 100 receives the image data generated by the host computer 200 through the input and output I/F unit 110, and allows the received image data to be stored in the reception data storage unit 141 (step S101).

The character data extraction unit 152 retrieves the image data from the reception data storage unit 141 and extracts the character data from the image data retrieved. Similarly, the background data extraction unit 151 extracts the background data from the image data retrieved (step S102). Herein, the character data represent the group of pixels extracted from the image data such that the video count value for K becomes one hundred (100) percent. The background data represent the group of pixels of the image data excluding the character data. With regard to the extraction sequence, the video count value of each pixel of the image data is retrieved, that is, the density of each color of the toner is retrieved. Upon completion of retrieving the video count value, the character data extraction unit 152 extracts the group of pixels as the character data from the image data such that the video count value for K becomes one hundred (100) percent. The background data extraction unit 151 extracts the group of pixels as the background data from the image data excluding the character data extracted by the character data extraction unit 152.

Subsequently, the contour extraction unit 153 extracts the contour of the character image as the contour data based on the character data extracted by the character data extraction unit 152 (step S103). The extraction of the contour data by the contour extraction unit 153 will be described later with reference to a flowchart of FIG. 5.

In a case where the contour data of the character image are extracted by the contour extraction unit 153, the fringe generation unit 154 fringes the character image, and the outline generation unit 155 generates the outline data based on the fringe data generated by the fringe generation unit 154 (step S104). The generation of the outline data by the outline generation unit 155 will be described later with reference to a flowchart of FIG. 7.

Subsequently, the dot correction specifying unit 156 creates the dot correction target specifying table specifying the dot to be a target for the density correction (step S105). Such a table is used to provide the background data having the corrected density to the outline data generated in step S104. A description of specifying the dot by the dot correction specifying unit 156 will be given later with reference to a flowchart of FIG. 9.

The dot correction unit 157 creates the dot correction table based on the dot correction target specifying table created in step S105 to provide the background data having the corrected density to the outline data generated in step S104 (step S106). Herein, the dot correction table represents the setting for the size of each dot of the outline data to be printed. The creation of the dot correction table will be described later with reference to a flowchart of FIG. 10. The dot correction unit 157 provides the background data having the corrected dots to the outline data portion based on the dot correction table created in step S106 (step S107).

Subsequently, the image composing unit 158 composites the background data and the character data extracted in step S102, and the outline data including the dots corrected in step S107, thereby generating the print data (step S108).

The print data generated in step S108 is output to the printer engine 160, so that the printer engine 160 prints the print data on the recording medium under the control by the controller 150 (step S109).

Figure 5:
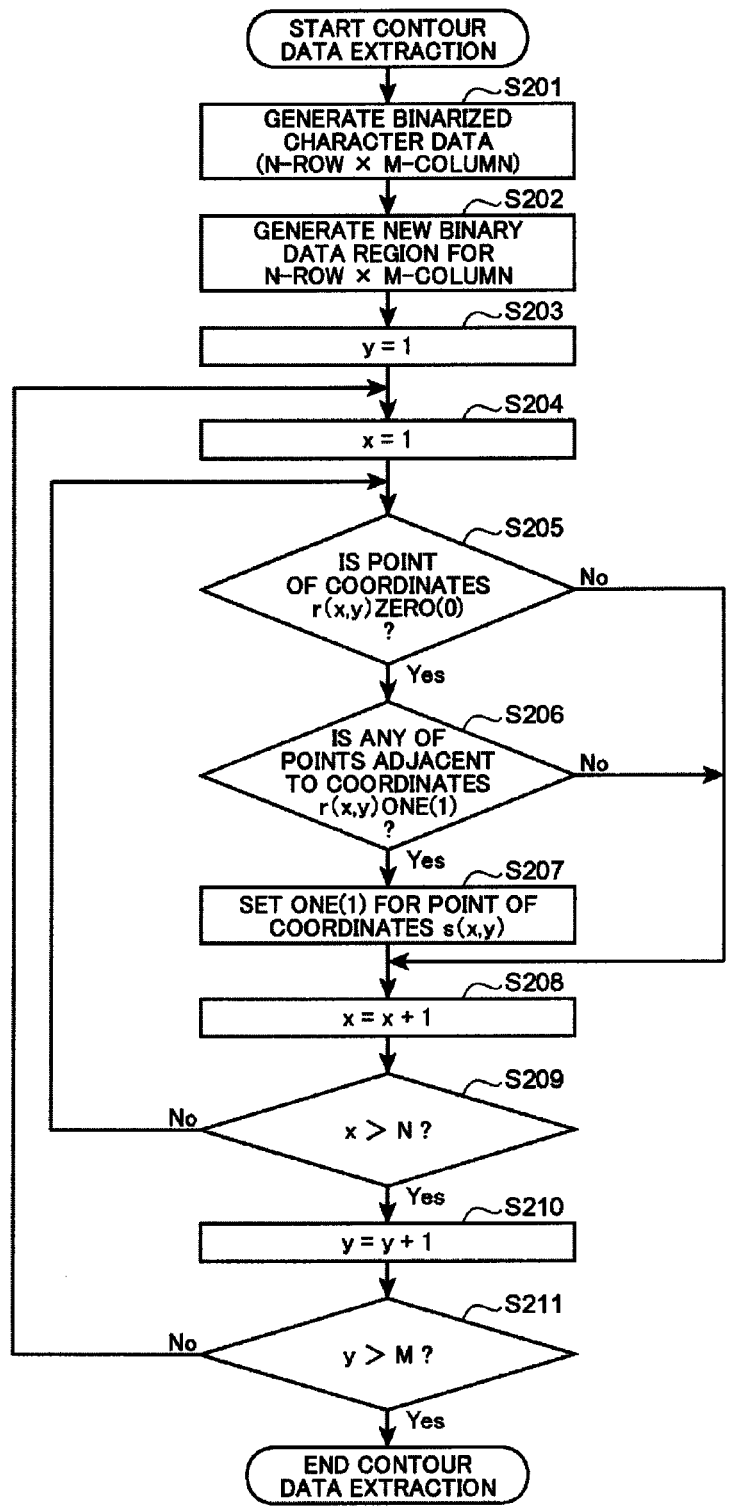
FIG. 5 is a flowchart illustrating an example procedure for extracting contour data according to the first embodiment of the present invention.

Referring to a flowchart of FIG. 5, a detailed description is given of the contour data extracted by the contour extraction unit 153 briefly described above with reference to step S103 in the flowchart of FIG. 4. The contour extraction unit 153 generates the character data in a binary table format using a value of 1 (one) with respect to the image data received from the host computer 200 where each of the points forming the image includes the data to be printed. The contour extraction unit 153, on the other hand, generates the character data in the binary table format using a value of 0 (zero) where each of the points forming the image data does not include the data to be printed. Herein, the character data represent the image data having row of N and column of M and each of the points forming the image data is expressed in coordinates r (x, y), where "x" represents a horizontal direction, and "y" represents a vertical direction. In a case where each of the points of the image data is expressed with respect to a print direction, the "x" of the horizontal direction and the "y" of the vertical direction can represent a main scanning direction and a sub-scanning direction, respectively (step S201).

Subsequently, the contour extraction unit 153 generates a new binary data region for the row N and column M as the contour data expressed in coordinates s (x, y), and sets zero (0) for all the values of such points (step S202).

The contour extraction unit 153 designates the coordinates r (x, y) of the character data as a start position of the character data (step S203, step S204).

Herein, the contour extraction unit 153 identifies whether or not the value of each point of the character data expressed in the coordinates r (x, y) in an optional position is zero (0). Where the value of the point expressed in the coordinates r (x, y) of the character data is identified as one (1) (No in step S205), a flow proceeds to step S208. Where the value of the point in the coordinates r (x, y) of the character data is identified as zero (0) (Yes in step S205), a flow proceeds to step S206.

Where the value of the point in the coordinates r (x, y) of the character data is zero (0) (Yes in step S205), the contour extraction unit 153 identifies whether or not a value of any of the points (x, y−1), (x−1, y), (x+1, y), and (x, y+1) adjacent to the coordinates r (x, y) of the character data is one (1). Where the values of the all the four points are zero (0) (No in step S206), a flow proceeds to step S208. Where the value of any of the four points is one (1) (Yes in step S206), on the other hand, the contour extraction unit 153 sets one (1) for the value of the point in the coordinates s (x, y) of the contour data (step S207).

The extraction unit 153 accumulates the x-coordinate of the character data by increment in the horizontal direction (step S208).

Subsequently, the contour extraction unit 153 identifies whether or not the value of the x-coordinate accumulated by the increment is greater than the row number N (step S209). Where the value of the x-coordinate is identified as being smaller than or equal to the row number N (No in step S209), the contour extraction unit 153 repeats step S205 through step S208. Where the value of the x-coordinate is identified as being greater than the row number N (Yes in step S209), on the other hand, the contour extraction unit 153 accumulates the value of the y-coordinate of the character data by the increment in the vertical direction (step S210).

The contour extraction unit 153 identifies whether or not the value of the y-coordinate accumulated by the increment is greater than the column number M (step S211). Where the value of the y-coordinate is identified as being greater than the column number M (Yes in step S211), the contour extraction unit 153 ends the procedure. Where the value of the y-coordinate is identified as being smaller than or equal to the column number M (No in step S211), the contour extraction unit 153 repeats step S204 through step S210.

Figure 6A:
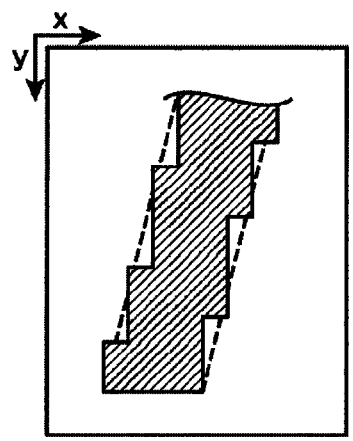
FIG. 6A trough FIG. 6D are schematic diagrams illustrating the contour data extraction according to the first embodiment of the present invention.

Referring to FIG. 6A through FIG. 6D, a detailed description is given of the contour data extracted by the contour extraction unit 153 briefly described above with reference to the flowchart of FIG. 5. FIG. 6A is an enlarged partial view partially illustrating the circle portion of the letter "A," that is, an area circled with the solid line, in the schematic diagram of FIG. 1A. Herein, size of the pixels is illustrated larger than that of the actual pixels to be printed for the sake of simplicity.

Figure 6B:
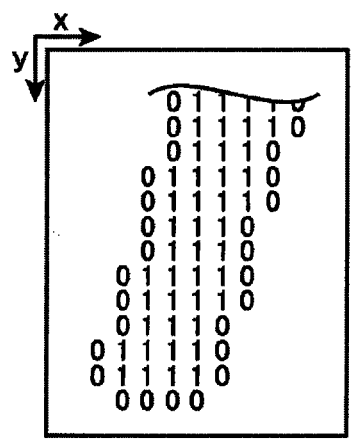

For example, the image data are formed of the pixels as illustrated in FIG. 6A. In a case where the image data is illustrated using the values of one (1) and zero (0), the character data corresponding to the image data can be expressed in the coordinates r (x, y) as illustrated in FIG. 6B. Herein, the value of 1 (one) in FIG. 6B represents a case where each pixel includes the data to be printed while the value of 0 (zero) represents a case where the each pixel does not include the data to be printed.

Figure 6C:
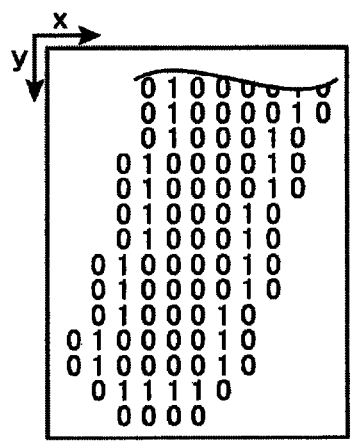
Figure 6D:
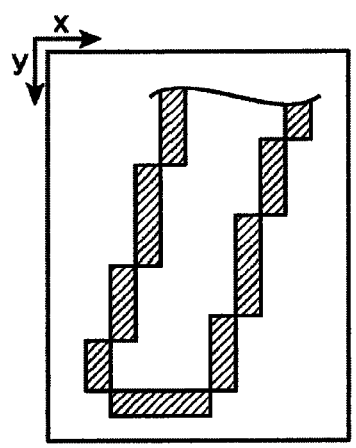

Herein, in a case where step S204 through step S210 described above with reference to the flowchart of FIG. 5 are applied to the coordinates r (x, y) of the character data, the counter data as illustrated in FIG. 6C can be obtained. Referring to FIG. 6D, the value 1 of the coordinates s (x, y) of the contour data illustrated in FIG. 6C is visualized. The contour data is a binary data corresponding to the boundary portion between the image data expressed with the character data and the outline data (described later) as illustrated in FIG. 6D. The contour data are used to generate the outline data.

Figure 7:
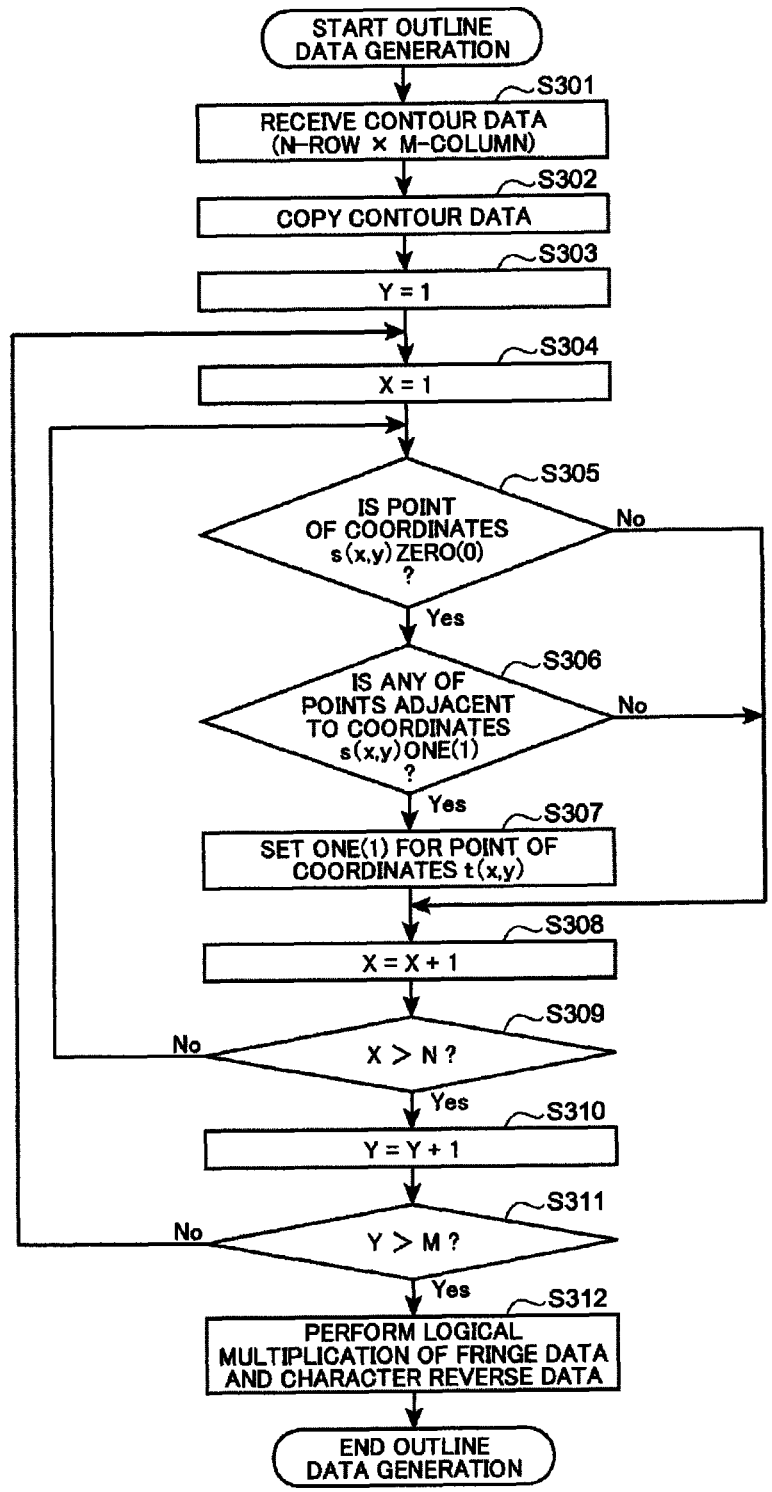
FIG. 7 is a flowchart illustrating an example procedure for generating outline data according to the first embodiment of the present invention.

Referring to the flowchart of FIG. 7, a detailed description is given of the generation of the outline data by the fringe generation unit 154 and the outline generation unit 155 briefly described above with reference to step S104 of the flowchart of FIG. 4. The fringe generation unit 154 receives the contour data having the row of N and column of M (N-row×M-column) described above from the contour extraction unit 153 (step S301). The fringe generation unit 154 generates a new binary data region for the N-row×M-column as the fringe data expressed in coordinates t (x, y), and copies the value of each point of the contour data (step S302).

Subsequently, the fringe generation unit 154 designates the coordinates s (x, y) of the contour data as the start position of the contour data (step S303).

The fringe generation unit 154 identifies whether or not the value of each point of the contour data expressed in the coordinates s (x, y) in an optional position is zero (0) (step S305). Where the value of the point expressed in the coordinates s (x, y) of the contour data is identified as one (1) (No in step S305), a flow proceeds to step S308. Where the value of the point expressed in the coordinates s (x, y) of the contour data is identified as zero (0) (Yes in step S305), a flow proceeds to step S306.

Where the value of the point in the coordinates s (x, y) of the contour data is zero (0) (Yes in step S305), the fringe generation unit 154 identifies whether or not a value of any of the points (x, y−1), (x−1, y), (x+1, y), and (x, y+1) adjacent to the coordinates s (x, y) of the contour data is one (1) (step S306). Where the values of all the four points are zero (0) (No in step S306), a flow proceeds to step S308. Where the value of any of the adjacent points is one (1) (Yes in step S306), the fringe generation unit 154 sets one (1) for the value of the point in the coordinates t (x, y) of the fringe data (step S307).

The fringe generation unit 154 accumulates the x-coordinate of the contour data by the increment in the horizontal direction (step S308).

Subsequently, the fringe generation unit 154 identifies whether or not the value of the x-coordinate accumulated by the increment is greater than the row number N (step S309). Where the value of the x-coordinate is identified as being smaller than or equal to the row number N (No in step S309), the fringe generation unit 154 repeats step S305 through step S308. Where the value of the x-coordinate is identified as being greater than the row number N (Yes in step S309), on the other hand, the fringe generation unit 154 accumulates the value of the y-coordinate of the contour data by the increment in the vertical direction (step S310).

Subsequently, the fringe generation unit 154 identifies whether or not the value of the y-coordinate accumulated by the increment is greater than the column number M (step S311). Where the value of the y-coordinate is identified as being smaller than or equal to the column number M (No in step S311), the fringe generation unit 154 repeats step S304 through step S310. Where the value of the y-coordinate is identified as being greater than the column number M (Yes in step S311), on the other hand, the fringe generation unit 154 supplies the fringe data generated to the outline generation unit 155.

Upon receiving the fringe data from the fringe generation unit 154, the outline generation unit 155 generates the outline data expressed in coordinates g (x, y) by performing the logical multiplication of the fringe data and character reverse data generated by reversing the values of one (1) and zero (0) in each point of the character data (step S312).

Referring to FIG. 8A through 8E, a detailed description is given of the generation of the outline data by the fringe generation unit 154 and the outline generation unit 155 briefly described above with reference to the flowchart of FIG. 7.

Herein, the coordinates s (x, y) of the contour data described above with reference to FIG. 6C is used to describe FIG. 8A through FIG. 8E.

Figure 8A:
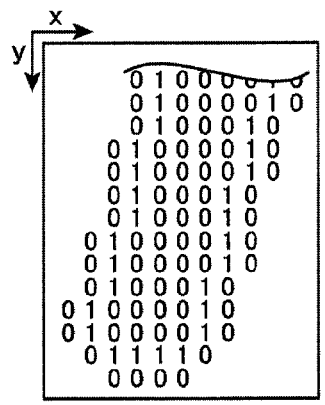
FIG. 8A through FIG. 8E are schematic diagrams illustrating the outline data generation according to the first embodiment of the present invention.
Figure 8B:
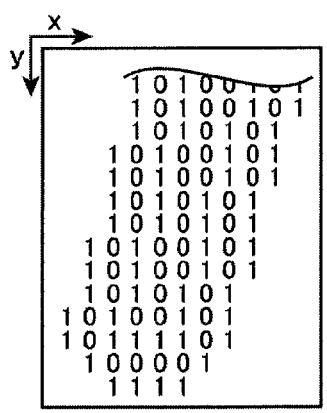
Figure 8C:
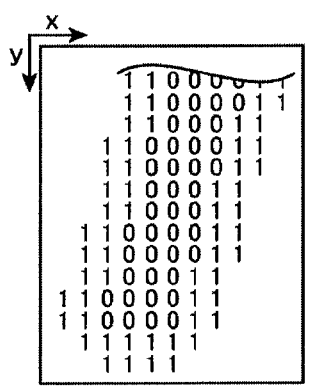
Figure 8D:
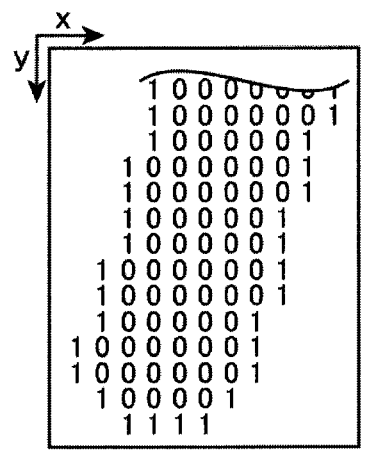
Figure 8E:
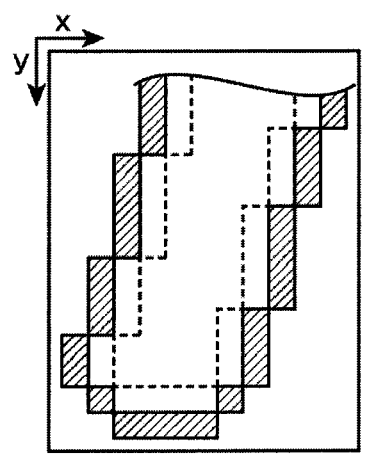

FIG. 8A is a schematic diagram corresponding to the coordinates s (x, y) of the contour data illustrated in FIG. 6C. In a case where step S304 through step S310 described above with reference to the flowchart of FIG. 7 are applied to the coordinates s (x, y) of the contour data, the fringe data as illustrated in FIG. 8B can be obtained. The outline generation unit 155 performs the logical multiplication of the fringe data generated and the character reverse data generated by reversing the values of one (1) and zero (0) in each point of the character data as illustrated in FIG. 8C, thereby generating the outline data as illustrated in FIG. 8D. Referring to FIG. 8E, each portion of the value 1 in the coordinates g (x, y) of the outline data as illustrated in FIG. 8D is marked. As illustrated in FIG. 8E, the outline data serves as the binary data corresponding to a portion between the contour data and the background data forming the background image, and is used to generate the dot correction target specifying data (described later).

Referring to the flowchart of FIG. 9, a detailed description is given of the generation of the dot correction target specifying data briefly described above with reference to step S105 in the flowchart of FIG. 4. The dot correction target specifying data specifies the target dot for the density correction to generate the background image having the reduced dot size in a portion corresponding to the outline image formed of the outline data. The dot correction specifying unit 156 generates the background data in the binary table format using the value of 1 (one) with respect to the image data received from the host computer 200 where each of the points forming the image data includes the data of the process colors (yellow, magenta, and cyan) to be printed. The dot correction specifying unit 156, on the other hand, generates the background data in the binary table format using the value of 0 (zero) where each of points of the image data does not include the data to be printed. Herein, the background data is generated with respect to each process color, and the yellow (Y), magenta (M), and cyan (C) are expressed in coordinates jy (x,y), coordinates jm (x, y), and coordinates jc (x, y), respectively (step S401).

Subsequently, the dot correction specifying unit 156 receives the outline data having the row of N and column of M (N-row×M-column) described above (step S402), and generates a new binary data region having the row of N and column of M (N-row×M-column) as the dot correction target specifying data expressed in coordinates h (x, y) (step S403).

The dot correction specifying unit 156 designates the coordinates h (x, y) of the dot correction target specifying data as a start position of the character data (step S404, step S405).

The dot correction specifying unit 156 identifies whether or not the values of the points in the background data expressed in the coordinates jy (x, y), coordinates jm (x, y), and coordinates jc (x, y) at optional positions are one (1) (step S406). Where the values of the points expressed in the respective coordinates jy (x, y), jm (x, y), and jc (x, y) of the background data are identified as zero (0) (No in step S406), a flow proceeds to step S409. Where the value of the points expressed in the respective coordinates jy (x, y), jm (x, y), and jc (x, y) of the background data are identified as one (1) (Yes in step S406), a flow proceeds to step S407.

Where the values of the points in the respective coordinates jy (x, y), jm (x, y), and jc (x, y) of the background data are one (1) (Yes in step S406), the dot correction specifying unit 156 identifies whether or not the value of each point of the outline data expressed in the coordinates g (x, y) is one (1) (step S407). Where the value of the point in the coordinates g (x, y) of the outline data is zero (0) (No in step S407), a flow proceeds to step S409. Where the value of the point in the coordinates g (x, y) of the outline data is one (1) (Yes in step S407), the dot correction specifying unit 156 sets one (1) for the value of the coordinates h (x, y) of the dot correction target specifying data to perform the dot correction (step S408).

Where the values of the points in the respective coordinates jy (x, y), jm (x, y), and jc (x, y) of the background data are zero (0) (No in step S406), and where the value of the point in the coordinates g (x, y) of the outline data is zero (0) (No in step S407), the dot correction specifying unit 156 sets zero (0) for the coordinates h (x, y) of the dot correction target specifying data, allowing the dot correction not to be performed (step S409).

Subsequently, the dot correction specifying unit 156 accumulates the x-coordinate of the background data and the x-coordinate of the outline data by the increment in the horizontal direction (step S410).

The dot correction specifying unit 156 identifies whether or not each value of the x-coordinate accumulated by the increment is greater than the row number N (step S411). Where each value of the x-coordinate is smaller than or equal to the row number N (No in step S411), the dot correction specifying unit 156 repeats step S406 through step S410. Where each value of the x-coordinate is greater than the row number N (Yes in step S411), the dot correction specifying unit 156 accumulates the y-coordinate of the background data and the y-coordinate of the outline data by the increment in the vertical direction (step S412).

The dot correction specifying unit 156 identifies whether or not each value of the y-coordinate accumulated by the increment is greater than the column number M (step S413). Where the value of the y-coordinate is smaller than or equal to the column number M (No in step S413), the dot correction specifying unit 156 repeats step S405 through step S412. Where the values of the y-coordinate is greater the column number M (Yes in step S413), the dot correction specifying unit 156 ends the generation of the dot correction target specifying data.

Figure 10:
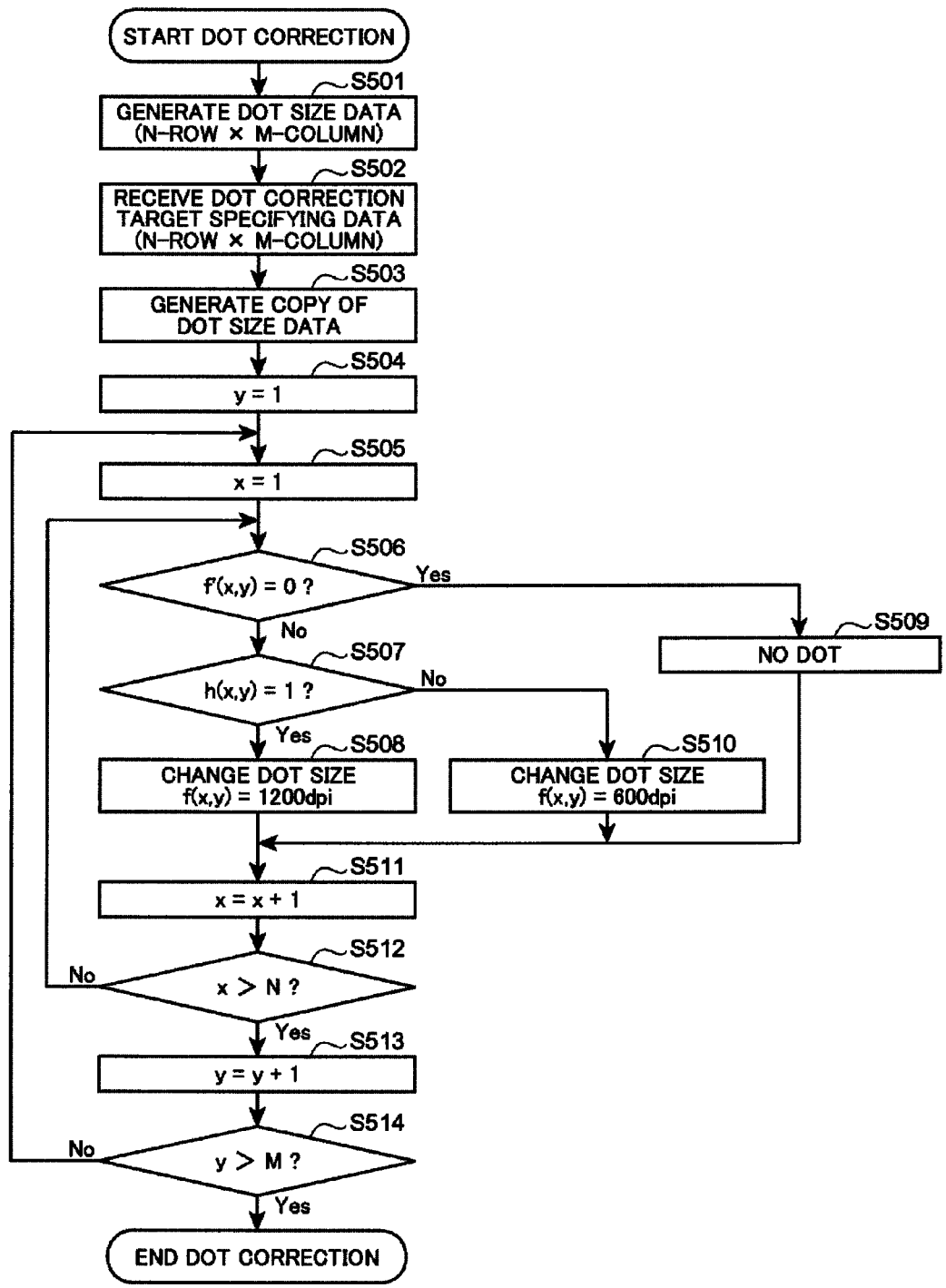
FIG. 10 is a flowchart illustrating an example procedure for generating dot correction data in a table format according to the first embodiment of the present invention.

Referring to the flowchart of FIG. 10, a detailed description is given of generation of the dot correction table briefly described above with reference to step S106 in the flowchart of FIG. 4. The dot correction data is generated in a table format by the dot correction unit 157 based on the dot correction target specifying data generated by the dot correction specifying unit 156, and is used to generate the background image having the reduced dot size in a portion corresponding to the outline image formed of the outline data. The dot correction unit 157 generates the dot correction data in the table format for the dot size of all the coordinates with respect to the image data received from the host computer 200. Herein, the correction data is f' (x, y). The dot size prior to the dot correction is arranged to be uniform in the dot correction data, and is assumed to be equivalent to 600 dpi (step S501).

The dot correction unit 157 receives the dot correction target specifying data having the row of N and the column of M (N-row×M-column) from the dot correction specifying unit 156, and generates new dot size data for the N-row×M-column as the dot data expressed in coordinates f (x, y) (step S502). The dot correction unit 157 copies the value of each point of the dot correction data (step S503).

The dot correction unit 157 designates the coordinates f' (x, y) of the correction data as a start position of the correction data (step S504, step S505).

The dot correction unit 157 identifies whether or not the value of each point of the dot correction data expressed in the coordinates f' (x, y) is zero (0) (step S506). Where the value of the point expressed in the coordinates f' (x, y) of the dot correction data is identified as zero (0) (Yes in step S506), a flow proceeds to step S509. Where the value of the point in the coordinates f' (x, y) of the dot correction data is identified as one (1) (No in step S506), a flow proceeds to step S507.

Where the value of the point in the coordinates f' (x, y) of the dot correction data is one (1) (No in step S506), the dot correction unit 157 identifies whether or not the value of each point of the dot correction target specifying data expressed in the coordinates h (x, y) is one (1) (step S507). Where the value of the point in the coordinates h (x, y) of the dot correction target specifying data is identified as zero (0) (No in step S507), a flow proceeds to step S510. Where the value of the point in the coordinates h (x, y) of the dot correction target specifying data is identified as one (1) (Yes in step S507), on the other hand, the dot correction unit 157 changes the dot size of f (x, y) to be equivalent to 1200 dpi which is smaller than the dot size equivalent to 600 dpi (step S508). In a case where the dot size is changed from the size equivalent to the 600 dpi to the size equivalent to 1200 dpi, the dot size can be changed by, for example, a method for reducing a diameter of the dot in a sub-line, or a method for reducing exposure energy of an exposing device (not shown).

Where the value of the point in the coordinates f' (x, y) of the dot correction data is identified as zero (0) (Yes in step S506), the dot correction unit 157 identifies that the point in the coordinates f' (x, y) has no dot, and sets zero (0) for the value of the dot correction data (step S509).

Where the value of the point in the coordinates h (x, y) of the dot correction target specifying data is identified as zero (0) (No in step S507), the dot correction unit 157 identifies that the point in the coordinates h (x, y) has no change in the dot size, and sets the dot size of f (x, y) to be equivalent to 600 dpi (step S510).

Subsequently, the dot correction unit 157 accumulates the x-coordinate of the dot correction data and the x-coordinate of the dot correction target specifying data by the increment in the horizontal direction (step S511).

The dot correction unit 157 identifies whether or not each value of x-coordinate accumulated by the increment is greater than the row number N (step S512). Where the row number N is smaller than or equal to the value of the x-coordinate (No in step S512), the dot correction unit 157 repeats the step S506 through step S511. Where the row number N is greater than the value of the x-coordinate (Yes in step S512), the dot correction unit 157 accumulates the y-coordinate of the dot correction data and the y-coordinate of the dot correction target specifying data in the vertical direction by the increment (step S513).

Subsequently, the dot correction unit 157 identifies whether or not each value of the y-coordinate accumulated by the increment is greater than the column number M (step S514). Where the value of the y-coordinate is smaller than or equal to the column number M (No in step 514), the do correction unit 157 repeats step S505 through step S513. Where the value of the y-coordinate is greater than the column number M (Yes in step 514), the dot correction unit 157 ends the generation of the dot correction data.

According to the first embodiment described above, the image processing apparatus can print the fringe portion of the character image to be recognized by the image reading apparatus with low density at which the fringe portion is visually recognized, thereby reducing (if not minimizing) the occurrences of losing the image information in the fringe portion, and maintaining the readability of the character image to be recognized.

Second Embodiment

According to the first embodiment described above, the background image is printed with low density in the outline data (i.e., the fringe portion) positioned in the periphery of the character data. According to a second embodiment, on the other hand, outline data position in the periphery of character data is printed using a complementary color. Herein, the complementary color represents a color that is an opposite hue with respect to a prescribed color on a color wheel. According to the second embodiment, the hue colors forming the character data are analyzed, and each of several essential hue colors is provided depending upon a situation based on an analysis result. The outline data is printed using the complementary color of the essential hue color, for example. According to the first embodiment described above, the hue color of the character data is limited to the single color of black in a case of printing. According to the second embodiment, on the other hand, the hue color of the character data is the single color of black (K) or process colors such as yellow (Y), magenta (M), and cyan (C).

A printer 1100 serving as an image processing apparatus according to the second embodiment is substantially similar to the printer 100 according to the first embodiment. Only components and configurations of the printer 1100 that differ from those of the above embodiment will be described, and like components will be given the same reference numerals as above and description thereof will be omitted.

Figure 11:
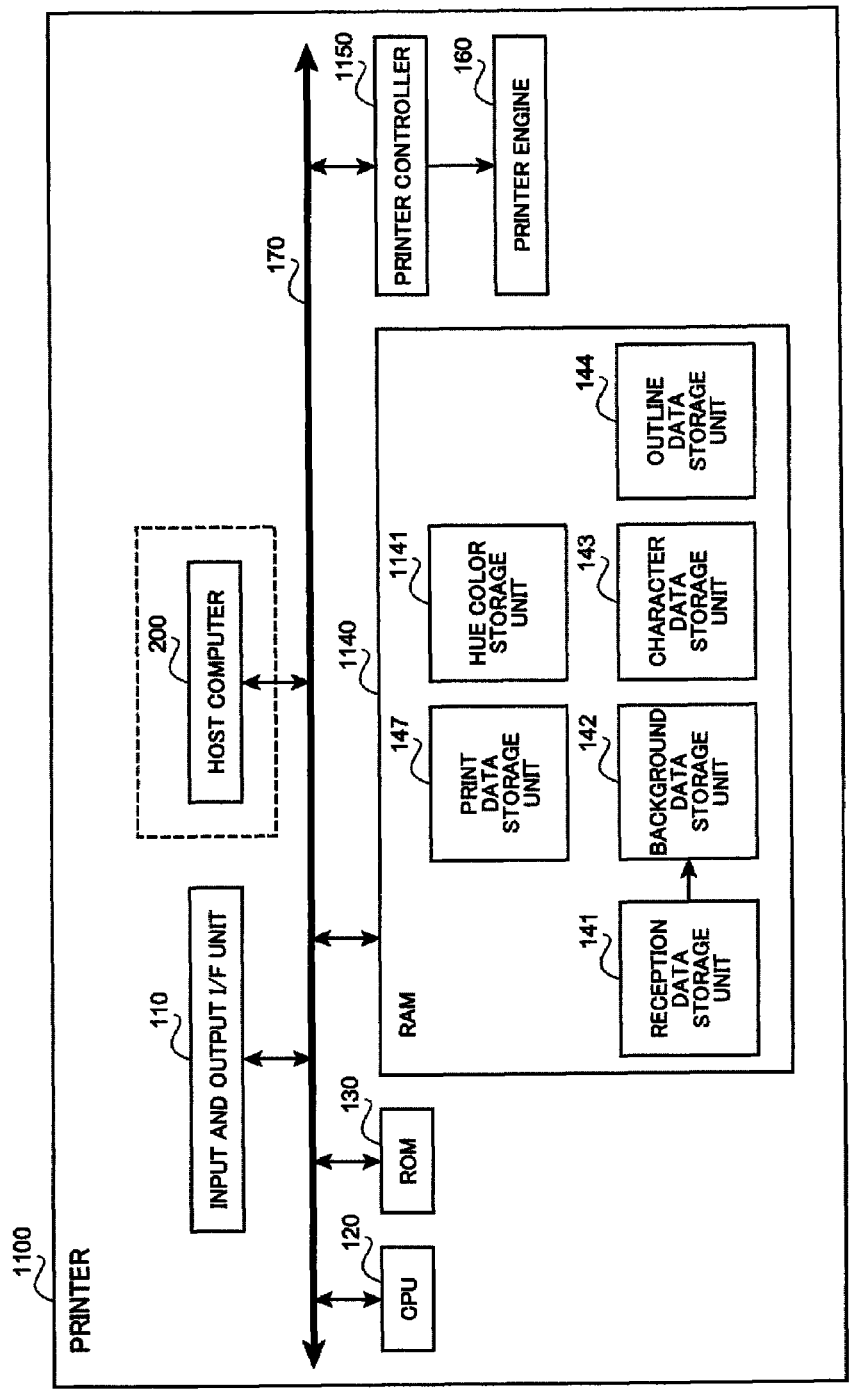
FIG. 11 is a block diagram illustrating a printer serving as an image processing apparatus according to a second embodiment of the present invention.

Referring to FIG. 11, the printer 1100 according to the second embodiment is illustrated with essential elements thereof in a block diagram. The printer 1100 includes a random access memory (RAM) 1140 and a printer controller 1150 instead of the RAM 140 and the printer controller 150 included in the printer 100 of the first embodiment.

The RAM 1140 serves as a main storage unit of the printer 1100. In a case where a central processing unit (CPU) 120 executes a control program stored in a read only memory (ROM) 130, the RAM 1140 serves as a memory region used as a working area. The RAM 1140 includes a reception data storage unit 141, a background data storage unit 142, a character data storage unit 143, an outline data storage unit 144, a print data storage unit 147, and a hue color storage unit 1141.

The hue color storage unit 1141 stores the hue color extracted from a hue color extraction unit 1151 (described later) and the hue color created by a hue color creation unit 1152 (described later).

Figure 12:
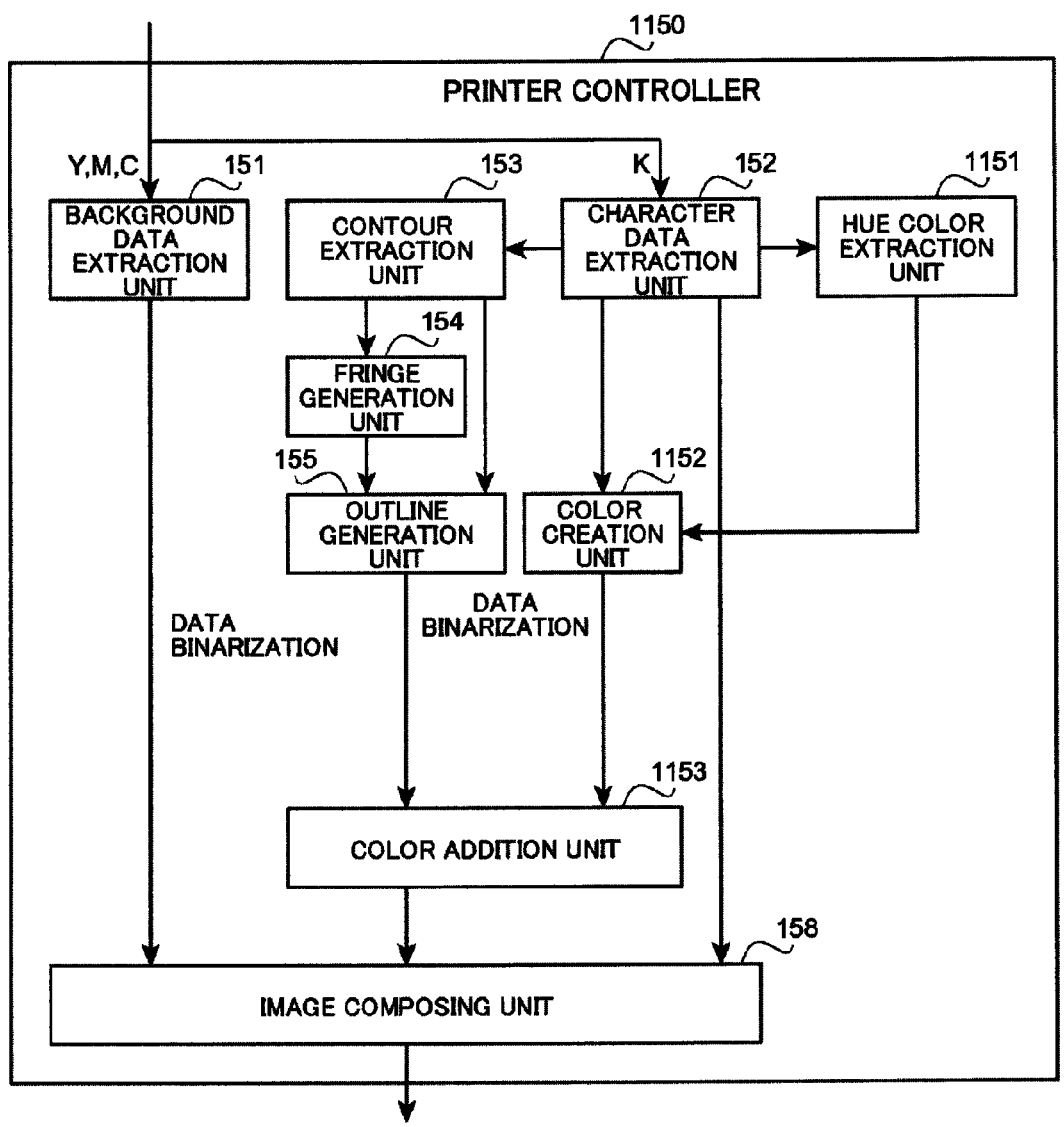
FIG. 12 is a block diagram illustrating a printer controller of the image processing apparatus illustrated in FIG. 11.

Referring to FIG. 12, the printer controller 1150 is illustrated in a block diagram. The print controller 1150 includes the background data extraction unit 151, a character data extraction unit 152, a contour extraction unit 153, a fringe generation unit 154, an outline generation unit 155, an image composing unit 158, the hue color extraction unit 1151, the hue color creation unit 1152, and a color addition unit 1153.

The hue color extraction unit 1151 extracts the hue color included in the character data. Particularly, the hue color extraction unit 1151 extracts a usage rate for each color of yellow (Y), magenta (M), cyan (C), and black (K) included in the character data.

The hue color creation unit 1152 creates the hue color to be added or adjusted to the outline data generated by the outline generation unit 155 based on the usage rate extracted by the hue color extraction unit 1151 for each color included in the character data.

The color addition unit 1153 adds or adjusts the hue color created by the hue color creation unit 1152 to the outline data generated by the outline unit 155.

Figure 13:
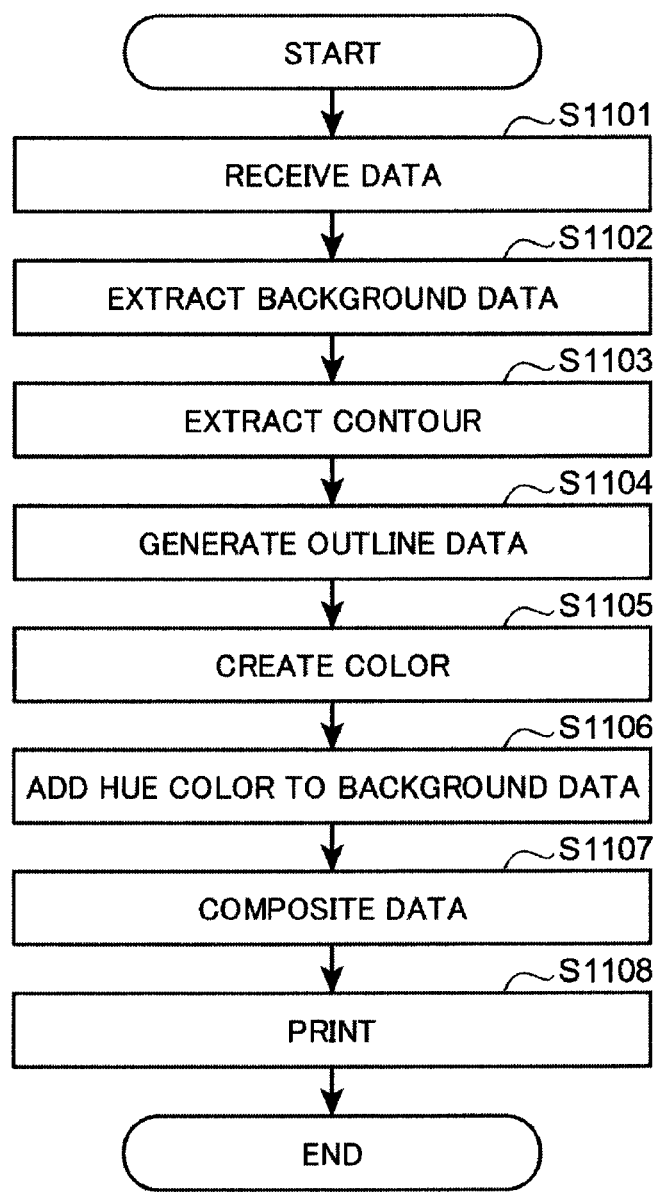
FIG. 13 is a flowchart illustrating an example procedure for processing an image by the printer according to the second embodiment of the present invention.

Referring to a flowchart of FIG. 13, a description is given of the image process by the printer 1100 according to the second embodiment. Since the flowchart of FIG. 13 is similar to that of FIG. 4 described above, procedures different from the above embodiment will be described in detail.

As illustrated in the flowchart of FIG. 13, step S1100 through step S1104 are substantially similar to step S101 through step S104 described the above with reference to the flowchart of FIG. 4 of the first embodiment, and the descriptions thereof are omitted for the sake of simplicity.

The hue color creation unit 1152 creates the hue color to be added or adjusted to the outline data generated by the outline generation unit 155 based on the usage rate extracted by the color extraction unit 1151 for each color included in the character data (step S1105). Herein, the hue color to be created can allow the character data to be prominent, and such creation of the hue color by the hue color creation unit 1152 will be described later with reference to a flowchart of FIG. 14.

The color addition unit 1153 adds or adjusts the hue color created by the color generation unit 1152 to the background data extracted in step S1102 (step S1106).

The image composing unit 158 composites the character data and the background data with the hue color added in step S1106, thereby generating the print data (step S1107).

The print data generated in step S1107 is output to a printer engine 160, and the printer engine 160 prints the print data on a recording medium under control by a controller 150 (step S1108).

Figure 14:
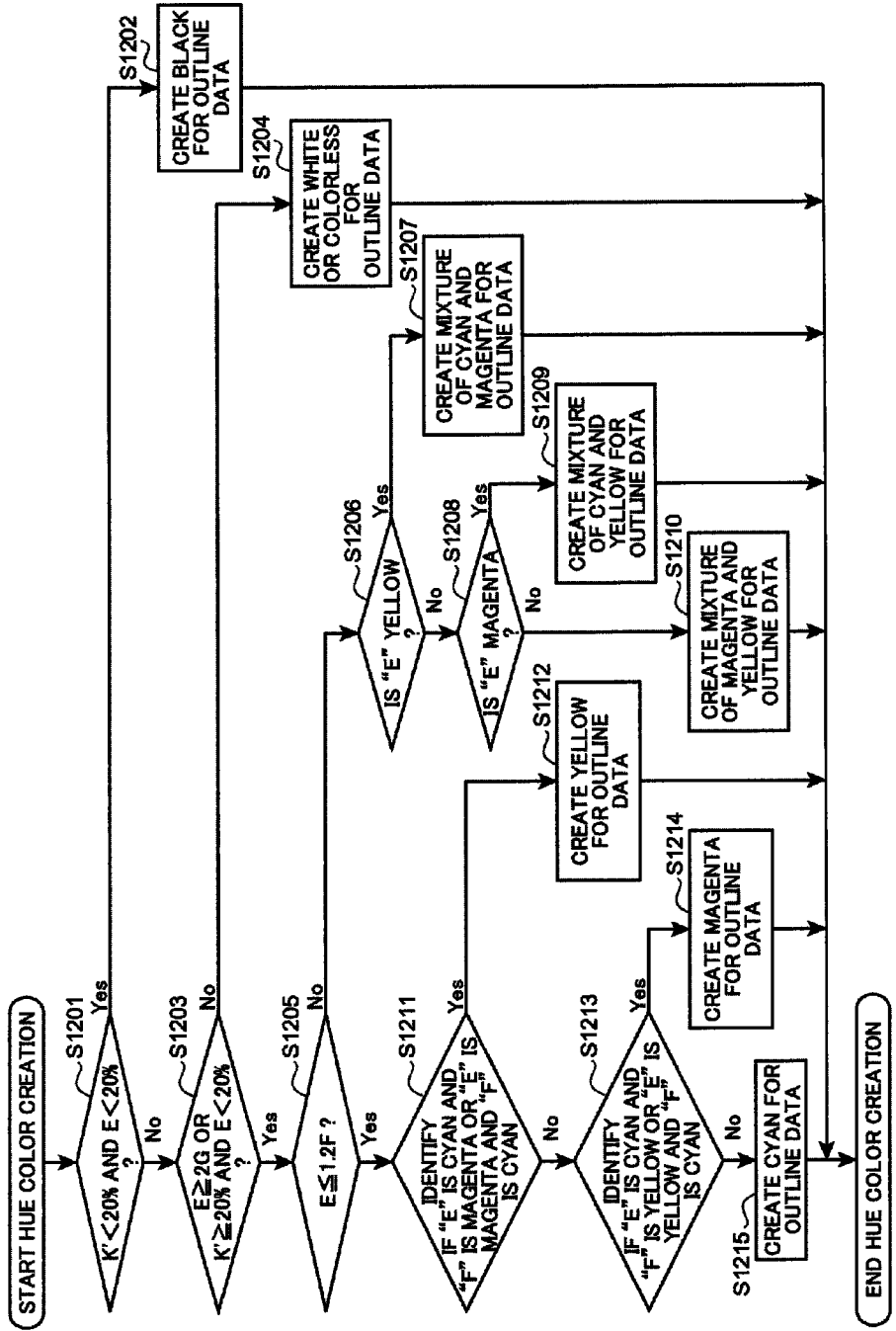
FIG. 14 is a flowchart illustrating an example procedure for creating a hue color according to the second embodiment of the present invention.

Referring to the flowchart of FIG. 14, a detailed description is given of the hue color created by the hue color creation unit 1152 briefly described with reference to step S103 of the flowchart of FIG. 13. In the flowchart of FIG. 14, letters E, F, and G represent the toner usage rates for any colors of yellow, magenta, and cyan, and a letter K' represents the toner usage rate for the color of black (K). Herein, a relationship of the usage rates is expressed as follows.

$$E \geq F \geq G$$

The hue color creation unit 1152 obtains the toner usage rate for each color forming the character data extracted by the color extraction unit 1151. The hue color creation unit 1152 identifies whether or not the usage rate K' for the black toner (K) is greater than or equal to twenty (20) percent, and whether or not the highest toner usage rate E is greater than or equal to twenty (20) percent. Where the usage rate K' for the black toner (K) is below twenty (20) percent, and the highest toner usage rate E is below twenty (20) percent (Yes in step S1201), a flow proceeds to step S1202 in which the hue color creation unit 1152 identifies that the character data is colorless or a color similar to white. Moreover, the hue color creation unit 1152 generates the hue of single black color (K) serving as the complementary color of the outline data generated by the outline generation unit 155 (step S1202). Where the usage rate K' for the black toner (K) is greater than or equal to twenty (20) percent, and the highest toner usage rate E is greater than or equal to twenty (20) percent (No in step S1201), a flow proceeds to step S1203.

Where the usage rate K' for the black toner (K) is greater than or equal to twenty (20) percent, and the highest toner usage rate E is greater than or equal to twenty (20) percent (No in step S1201), the hue color creation unit 1152 identifies whether or not E≥2G or K'≥20% is satisfied and E<20% is satisfied to identify whether the character data is mainly formed of the toners of three process colors of yellow (Y), magenta (M), and cyan (C) or the single black color (K), or whether the character data is mainly formed of the toners of two process colors or the single black color (step S1203). Where E≥2G or K'≥20% is not satisfied and E<20% is not satisfied (No in step S1203), a flow proceeds to step S1204. The hue color creation unit 1152 identifies the character data as being uniformly formed of the toners of three colors, and identifies the character data as being formed of the black toner (K). Moreover, the hue color creation unit 1152 generates the hue color of white or colorless to be the complementary color of the outline data generated by the outline generation unit 155 (step S1204). According to the present invention, however, there is assumed to be no such white toner or colorless toner. Consequently, the hue color to be added or adjusted to the outline data is not generated herein.

Where E≥2G or K'≥20% is satisfied and E<20% is satisfied (Yes in step S1203), a flow proceeds to step S1205. The hue color creation unit 1152 identifies whether or not E≤1.2 F is satisfied to identify whether the character image is mainly formed of the toner of any of two process colors among yellow, magenta, and cyan or a single process color. Where E≤1.2 F is not satisfied (No in step S1205), the hue color creation unit 1152 identifies the character data as being formed of the toner of single process color, and identifies whether or not such a single process color is yellow (step S1206). Where the single color is identified as yellow (Yes in step S1206), the hue color creation unit 1152 creates the hue color to be the complementary color of the outline data generated by the outline generation unit 155 by mixture of the cyan toner and the magenta toner (step S1207). Herein, an amount of each of the cyan toner and the magenta toner is assumed to be equal.

Where the single color is not identified as yellow (No in step S1206), on the other hand, the hue color creation unit 1152 identifies whether or not the single color is magenta (step S1208). Where the single color is identified as magenta (Yes in step S1208), the hue color creation unit 1152 creates the hue color to be the complementary color of the outline data generated by the outline generation unit 155 by mixture of the cyan toner and the yellow toner (step S1209). Herein, an amount of each of the cyan toner and the yellow toner is assumed to be equal. Where the single color is not identified as magenta (No in step S1208), the hue color creation unit 1152 identifies the character data as being formed of the single process color of cyan, and creates the hue color to be the complementary color of the outline data generated by the outline generation unit 155 by mixture of the magenta toner and the yellow toner (step S1210). Herein, an amount of each of the magenta toner and the yellow toner is assumed to equal.

Where E≤1.2 F is satisfied (Yes in step S1205), the hue color creation unit 1152 identifies the character data as being formed of the two process colors, and identifies whether or not such two colors are the toners of cyan and magenta (step S1211). Where the two colors are identified to be the toners of cyan and magenta (Yes in step S1211), the hue color creation unit 1152 creates the hue color of the yellow toner to be the complementary color of the character data (step S1212). Where the two colors are not identified as the toners of cyan or magenta (No in step S1211), the hue color creation unit 1152 identifies whether or not the two colors are the toners of cyan and yellow (step S1213). Where the two colors are identified as the toners of cyan and yellow (Yes in step S1213), the hue color creation unit 1152 creates the hue color of the magenta toner to be the complementary color of the character data (step S1214). Where the two colors are not identified as the toners of cyan and yellow (No in step S1213), the hue color creation unit 1152 identifies the character data as being formed of the two process colors of yellow and magenta, and creates the hue color of the cyan toner to be the complementary color of the character data (step S1215).

Moreover, a position of the hue color of the character data in the color wheel can be determined by calculation based on the formation of the character data, thereby providing a similar advantage as the second embodiment described above. Particularly, the position of the character data in the color wheel is calculated based on the formation of the character data analyzed. Such a calculated position is rotated by one hundred eighty (180) degrees to calculate a position of the complementary color, and the formation of the hue color to be added to the outline data based on the calculated position is calculated. The outline data is colored based on the hue color of the complementary color calculated. According to such a method, the outline data can be colored in a color more similar to the complementary color with respect to the character data.

According to the second embodiment of the present invention described above, the image processing apparatus can print the fringe portion of the character image to be recognized by the image reading apparatus by using the color having a different hue color from the character image, that is, complementary color. Therefore, the image processing apparatus of the second embodiment can allow the character image to be prominent although the character image and the background image are formed of similar hue colors.

According to the first and second embodiments of the present invention, the electrophotographic method is described as an example of a printing method. However, the present invention is not limited to thereto. For example, the present invention can be applied to a printing method, for example, an ink jet method, capable of printing an image by formation of dots in the recording medium. Moreover, the printer is described above as an example of the image processing apparatus in the first and second embodiment of the present invention. However, the present invention can be applied to an image processing apparatus, for example, a display device capable of displaying an image on a liquid crystal display, and multi-functional peripheral (MFP).

The present invention has been described above with regard to particular embodiments, but the present invention is not limited thereto. As can be appreciated by those skilled in the art, numerous additional modifications and variation of the present invention are possible in light of the above-described teachings. It is therefore to be understood that, within the scope of the appended claims, the disclosure of this patent specification may be practiced otherwise than as specifically described herein.

What is claimed is:

1. An image processing apparatus comprising:
a character data extraction unit extracting character data, forming a character image serving as a target to be read by an image reading apparatus, from image data;
an outline data generation unit generating outline data forming an outline image of the character image from the character data; and
an image density changing unit changing an original image density of the outline image to a lower but greater than zero density based on the outline data generated by the outline data generation unit,
wherein the outline data is an outside portion of a character image, and is region data having a prescribed width adjacent to the character image.

2. The image processing apparatus according to claim 1, wherein the image density changing unit changes a resolution to change the image density of the outline image.

3. The image processing apparatus according to claim 1, wherein the image density changing unit changes a dot diameter of a print dot forming the outline image to change the image density of the outline image.

4. The image processing apparatus according to claim 1, wherein the dot diameter is changed on a sub-line.

5. The image processing apparatus according to claim 1, wherein the character image is letter data.

6. The image processing apparatus according to claim 1, wherein the image data is made of a character image and a background image, and the outline data is a region of the background image.

7. The image processing apparatus according to claim 1, wherein a density of the outline data is lowered by a prescribed value, and the outline data is displayed or printed in a region of the outline data.

8. The image processing apparatus according to claim 1, wherein a color of the outline data is changed to a color that is a complementary color.

9. An image processing apparatus comprising:
a character data extraction unit extracting character data, forming a character image serving as a target to be read by an image reading apparatus, from image data;
an outline data generation unit generating outline data forming an outline image of the character image from the character data; and
a hue color changing unit changing an original hue color of the outline image to a lower but greater than zero density.

10. The image processing apparatus according to claim 9, wherein the hue color changing unit changes the hue color of the image data corresponding to the outline data based on hue color information of the character data.

* * * * *